(12) United States Patent
Andersson et al.

(10) Patent No.: US 11,308,190 B2
(45) Date of Patent: Apr. 19, 2022

(54) BIOMETRIC TEMPLATE HANDLING

(71) Applicant: Fingerprint Cards AB, Gothenburg (SE)

(72) Inventors: Markus Andersson, Staffanstorp (SE); Jan Nilsson, Harlösa (SE); Anders Khullar, Bjärred (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 77 days.

(21) Appl. No.: 16/763,620

(22) PCT Filed: Nov. 9, 2018

(86) PCT No.: PCT/SE2018/051147
§ 371 (c)(1),
(2) Date: May 13, 2020

(87) PCT Pub. No.: WO2019/103677
PCT Pub. Date: May 31, 2019

(65) Prior Publication Data
US 2020/0366488 A1    Nov. 19, 2020

(30) Foreign Application Priority Data
Nov. 24, 2017 (SE) .................. 1751451-4

(51) Int. Cl.
*G06F 21/32* (2013.01)
*H04L 9/08* (2006.01)
(Continued)

(52) U.S. Cl.
CPC ............ *G06F 21/32* (2013.01); *H04L 9/0819* (2013.01); *H04L 9/30* (2013.01); *H04L 9/3228* (2013.01); *H04L 9/3231* (2013.01)

(58) Field of Classification Search
None
See application file for complete search history.

(56) References Cited

U.S. PATENT DOCUMENTS

2011/0016317 A1   1/2011   Abe
2012/0079288 A1*  3/2012   Hars ................ G06F 21/00
                                              713/193
(Continued)

FOREIGN PATENT DOCUMENTS

CN    105243306 A    1/2016
EP      1912151 A1   4/2008
(Continued)

OTHER PUBLICATIONS

PCT International Search Report and Written Opinion dated Jan. 31, 2019 for International Application No. PCT/SE2018/051147, 11 pages.
(Continued)

*Primary Examiner* — Benjamin E Lanier
(74) *Attorney, Agent, or Firm* — RMCK Law Group, PLC

(57) ABSTRACT

A method for handling biometric templates is disclosed for an authenticating device applying biometric authentication. The method comprises acquiring a set of biometric data associated with a prospect user, and acquiring a decryption key (associated with an encrypted biometric template associated with an enrolled user of the authenticating device) from a key carrying device external to the authenticating device responsive to the key carrying device being in a vicinity of the authenticating device. The method also comprises retrieving, from a storage medium, at least a part of the encrypted biometric template associated with the enrolled user, decrypting the retrieved part of the biometric template using the acquired decryption key and performing an attempt to authenticate the prospect user as the enrolled user based on a comparison between the acquired set of biometric data and the decrypted part of the biometric template.

26 Claims, 8 Drawing Sheets

(51) Int. Cl.
    *H04L 9/30*     (2006.01)
    *H04L 9/32*     (2006.01)

(56)         References Cited

U.S. PATENT DOCUMENTS

| | | |
|---|---|---|
| 2013/0174243 A1 | 7/2013 | Inatomi et al. |
| 2013/0314208 A1 | 11/2013 | Risheq et al. |
| 2013/0339749 A1 | 12/2013 | Spuehier et al. |
| 2014/0189359 A1* | 7/2014 | Marien ................. H04L 9/3234 713/172 |
| 2015/0082024 A1* | 3/2015 | Smith ................. H04L 67/1095 713/155 |
| 2016/0057124 A1* | 2/2016 | Boyle ................... H04W 12/08 726/7 |
| 2016/0080943 A1* | 3/2016 | Ives-Halperin ........ G06Q 10/02 713/168 |
| 2017/0126672 A1* | 5/2017 | Jang ................... H04L 63/0853 |
| 2017/0264429 A1 | 9/2017 | Ahn et al. |
| 2017/0300678 A1 | 10/2017 | Metke et al. |
| 2017/0302696 A1* | 10/2017 | Schutz ..................... H04L 9/30 |
| 2018/0167200 A1* | 6/2018 | High ................... A61B 5/1171 |
| 2018/0219680 A1* | 8/2018 | Kamal ................. H04L 9/3231 |
| 2020/0279269 A1* | 9/2020 | Wagner ............. G06Q 20/3226 |

FOREIGN PATENT DOCUMENTS

| | | |
|---|---|---|
| EP | 2940617 A1 | 11/2015 |
| EP | 3037998 B1 | 7/2019 |

OTHER PUBLICATIONS

Extended European Search Report dated Jul. 6, 2021 for EP Application No. 18881131.9, 7 pages.

* cited by examiner

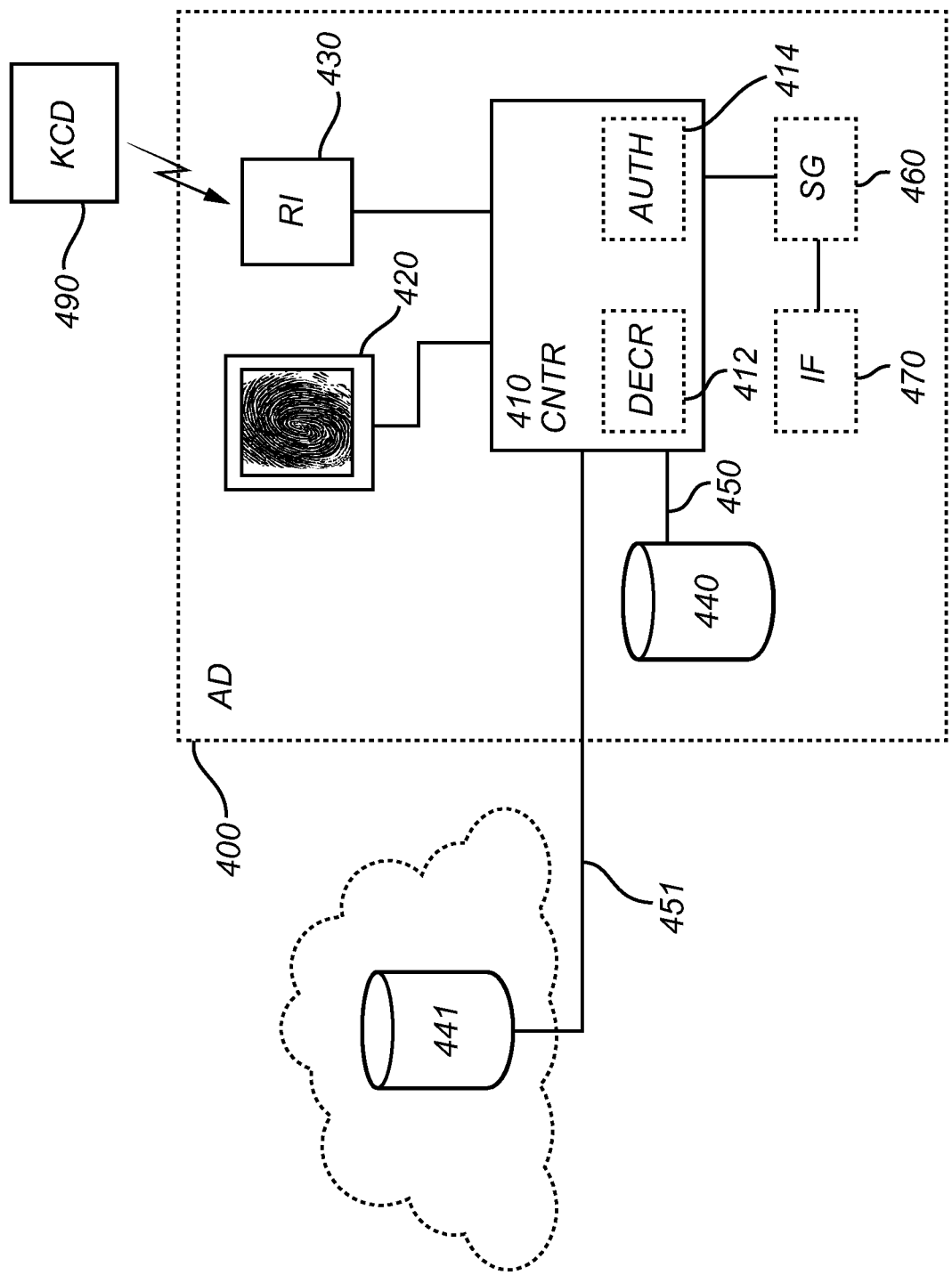

BIOMETRIC TEMPLATE HANDLING

CROSS-REFERENCE TO RELATED APPLICATIONS

This application is a 371 U.S. National Stage of International Application No. PCT/SE2018/051147, filed Nov. 9, 2018, which claims priority to Swedish Patent Application No. 1751451-4, filed Nov. 24, 2017. The disclosures of each of the above applications are incorporated herein by reference in their entirety.

TECHNICAL FIELD

The present disclosure relates generally to the field of biometric authentication. More particularly, it relates to handling of biometric templates for biometric authentication.

BACKGROUND

Biometric data is often used to authenticate a user, for example to determine whether the user is to be granted access to a restricted area (e.g. a physical area or a virtual area such as one or more functions of a device). Common biometric data include, but is not limited to, fingerprint data and iris data.

An authentication process typically involves comparing a set of biometric data associated with a prospect user and acquired via a biometric reader to a biometric template associated with an enrolled user and granting access for the prospect user only when a match is found between the acquired set of biometric data and the biometric template.

The security of such authentication is typically of high importance. One approach of qualifying the security is by measuring a false acceptance rate (FAR) which is a metric with values between zero and one, wherein a value equal to one means that access is always granted to an unauthorized user.

On the other hand, user friendliness of such authentication is typically also important. One approach of qualifying the user friendliness is by measuring a false rejection rate (FRR) which is a metric with values between zero and one, wherein a value equal to one means that access is never granted to an authorized user.

Another aspect of the trade-off between security and user friendliness is associated with the enrolment process, which should preferably be as secure as possible while not being overly cumbersome for the user to utilize. For security reasons, biometric templates created in an enrollment process are generally not shared between different devices.

Thus, there is a need for user friendly, yet secure, approaches to biometric enrolment and biometric authentication.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method for handling biometric templates for an authenticating device applying biometric authentication.

The method comprises acquiring, via a biometric reader, a set of biometric data associated with a prospect user of the authenticating device, and acquiring a decryption key from a key carrying device external to the authenticating device responsive to the key carrying device being in a vicinity of the authenticating device, wherein the decryption key is associated with an encrypted biometric template associated with an enrolled user of the authenticating device.

The method also comprises retrieving, from a storage medium, at least a part of the encrypted biometric template associated with the enrolled user, decrypting the retrieved part of the biometric template using the acquired decryption key, and performing an attempt to authenticate the prospect user as the enrolled user based on a comparison between the acquired set of biometric data and the decrypted part of the biometric template.

In some embodiments, the decryption key comprises an open identifier of the key carrying device and acquiring the decryption key comprises reading the open identifier from the key carrying device.

In some embodiments, the decryption key comprises a protected key and acquiring the decryption key comprises providing a password to the key carrying device and, in response thereto, receiving the protected key from the key carrying device.

In some embodiments, the authenticating device keeps a communication key pair comprising a public communication key and a private communication key, and acquiring the decryption key comprises transmitting the public communication key to the key carrying device, receiving a challenge message from the key carrying device, transmitting a response message to the key carrying device, receiving the decryption key from the key carrying device when the transmitted response message is correct, wherein the decryption key is encrypted by the public communication key, and decrypting the decryption key using the private communication key.

According to some embodiments, the method further comprises (when the attempt to authenticate the prospect user as the enrolled user is successful) locally storing the decrypted part of the biometric template, allowing further attempts to authenticate the prospect user as the enrolled user based on the locally stored decrypted part of the biometric template, and discarding the locally stored decrypted part of the biometric template when a discarding event occurs.

In some embodiments, the method further comprises transferring at least a portion of the encrypted biometric template to one or more other authenticating devices and/or to a biometric template server for retrieval by one or more other authenticating devices.

The biometric template may be a fingerprint template and the acquired set of biometric data is indicative of one or more fingerprint features in some embodiments.

The biometric template may be an iris template and the acquired set of biometric data is indicative of one or more iris features in some embodiments.

In some embodiments, the acquired decryption key is only temporarily present in the authentication device.

The method further comprises discarding the acquired decryption key as soon as the attempt to authenticate the prospect user as the enrolled user is completed according to some embodiments.

In some embodiments, the storage medium is comprised in the authenticating device.

In some embodiments, the storage medium is comprised in a portable storage device (e.g. a USB-memory) connectable to the authenticating device.

In some embodiments, the storage medium is comprised in a cloud-based server external to the authenticating device.

According to some embodiments, the part of the biometric template comprises the entire biometric template.

In some embodiments, the method further comprises enrolling a user of the authenticating device by acquiring (via the biometric reader) an enrolment set of biometric data associated with the user to be enrolled, acquiring an encryption key from the key carrying device associated with the user to be enrolled, wherein the encryption key is associated with the decryption key of the key carrying device, encrypting, using the acquired encryption key, a biometric template created based on the acquired enrollment set of biometric data, and storing the encrypted biometric template in the storage medium.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for handling biometric templates for an authenticating device applying biometric authentication.

The arrangement comprises a controller configured to cause acquisition, via a biometric reader, of a set of biometric data associated with a prospect user of the authenticating device and acquisition of a decryption key from a key carrying device external to the authenticating device responsive to the key carrying device being in a vicinity of the authenticating device, wherein the decryption key is associated with an encrypted biometric template associated with an enrolled user of the authenticating device.

The controller is also configured to cause retrieval, from a storage medium, of at least a part of the encrypted biometric template associated with the enrolled user, decryption of the retrieved part of the biometric template using the acquired decryption key, and performance of an attempt to authenticate the prospect user as the enrolled user based on a comparison between the acquired set of biometric data and the decrypted part of the biometric template.

In some embodiments, the arrangement further comprises the biometric reader configured to provide the set of biometric data associated with the prospect user of the authenticating device.

In some embodiments, the arrangement further comprises a radio interface configured to receive the decryption key from the key carrying device.

In some embodiments, the arrangement further comprises a storage medium interface configured to receive the part of the encrypted biometric template associated with the enrolled user from the storage medium.

In some embodiments, the arrangement further comprises the storage medium.

In some embodiments, the arrangement further comprises a decrypter configured to decrypt the part of the biometric template using the acquired decryption key.

In some embodiments, the arrangement further comprises an authenticator configured to perform the attempt to authenticate the prospect user as the enrolled user based on the comparison between the acquired set of biometric data and the decrypted part of the biometric template.

According to some embodiments, the controller is further configured to cause enrollment of a user of the authenticating device by causing acquisition, via the biometric reader, of an enrolment set of biometric data associated with the user to be enrolled and acquisition of an encryption key from the key carrying device associated with the user to be enrolled, wherein the encryption key is associated with the decryption key of the key carrying device. In such embodiments, the controller is further configured to cause enrollment of a user of the authenticating device by causing encryption, using the acquired encryption key, of a biometric template created based on the acquired enrollment set of biometric data, and storing of the encrypted biometric template in the storage medium.

A fourth aspect is an authenticating device comprising the arrangement of the third aspect.

A fifth aspect is an authentication system comprising the authenticating device of the fourth aspect and the key carrying device.

In some embodiments, any of the above aspects may additionally have features identical with or corresponding to any of the various features as explained above for any of the other aspects.

An advantage of some embodiments is that the reliability of the authentication is improved and/or the authentication becomes more secure compared to when conventional approaches are applied.

Another advantage of some embodiments is that flexibility regarding the security of the authentication is provided or increased compared to when conventional approaches are applied.

Yet an advantage of some embodiments is that biometric templates (or parts thereof) can be securely transferred between devices and/or between a device and a biometric template server.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 4 is a schematic block diagram illustrating an example arrangement according to some embodiments;

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where an encrypted biometric template and the corresponding decryption key are kept in different devices and wherein an authenticating device acquires the decryption key for decryption of the encrypted biometric template in preparation for an authentication attempt.

The decryption key is kept in a key carrying device which may, for example, be a body-integrated so called bio tag (a near field communication—NFC—transponder that may be encapsulated and implanted in the body of a user). The encrypted biometric template is kept in a storage medium which may, for example, be comprised in the authenticating device, or in a cloud-based server external to the authenticating device, or in a combination of both.

The acquiring of the decryption key is subject to a criterion that the key carrying device is in a vicinity of the authenticating device. Thereby, the security of the authentication may be increased compared to, for example, approaches where the decryption key and the encrypted biometric template are both kept in the authenticating device.

Furthermore, the decryption key is not associated with the authentication device but is rather associated with an enrolled user of the authenticating device; more precisely put the decryption key is associated with an encrypted biometric template which is in turn associated with the enrolled user of the authenticating device. In the following description, the decryption key will be described as associated with an enrolled user of the authenticating device for compactness of the text.

The feature above provides for that the same encrypted biometric template may be used by several authenticating devices and enrolment is simplified since, once enrolled on one authenticating device, the encrypted biometric template(s) associated with the enrolled user can be securely transferred to other authenticating devices. This advantage becomes particularly prominent in the context of the multitude of devices for the Internet of Things (IoT-devices).

Figure 1:
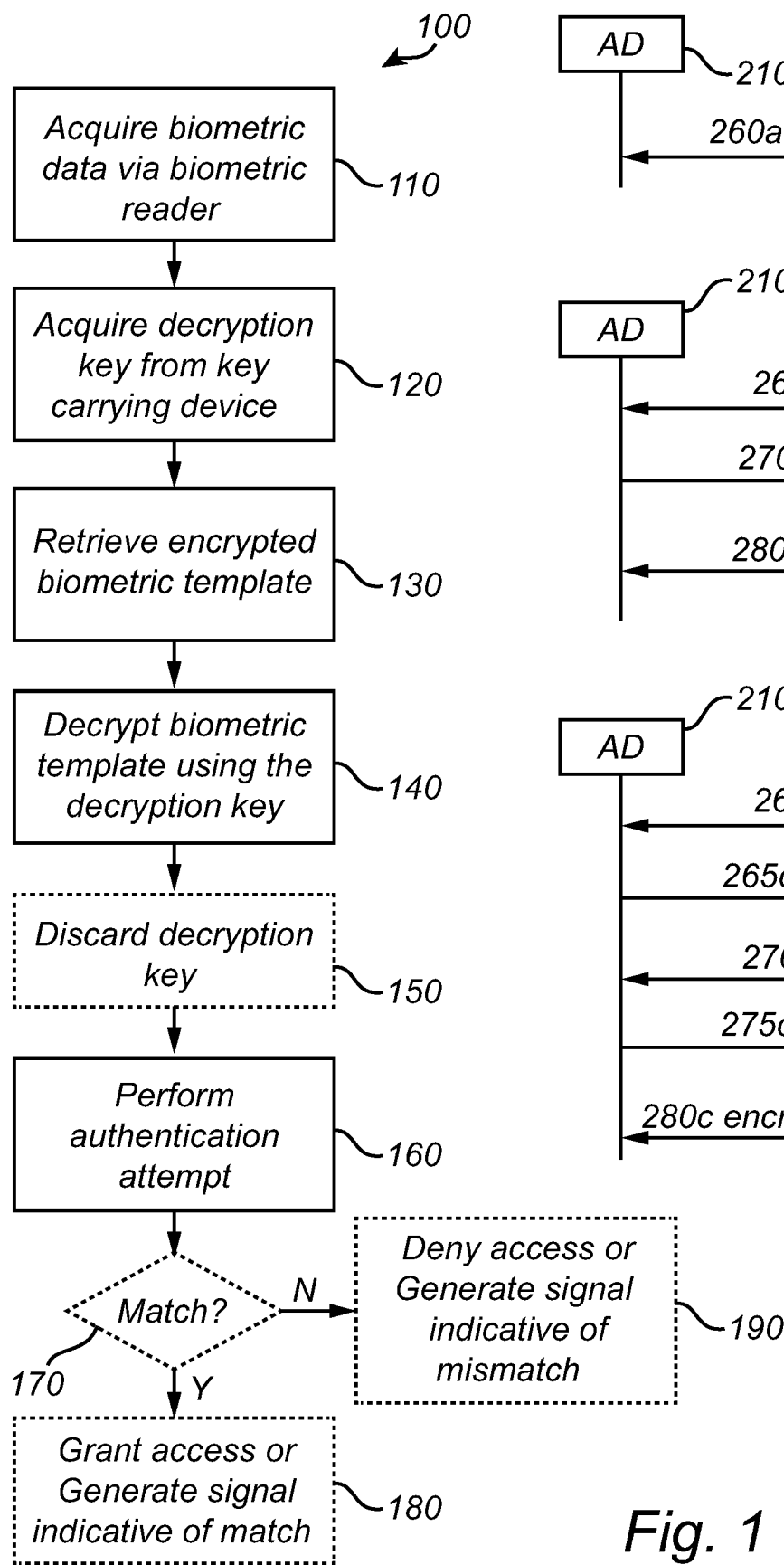
FIG. 1 is a flowchart illustrating example method steps according to some embodiments.

FIG. 1 illustrates an example method 100 for handling biometric templates for an authenticating device applying biometric authentication. The authenticating device may, for example, be an access granting device, such as a smartphone or a door lock.

The method starts in step 110 where a set of biometric data associated with a prospect user of the authenticating device is acquired via a biometric reader. The set of biometric data may be indicative of any suitable biometric features, for example, fingerprint features, palm print features, iris features, facial features, etc. Likewise, the biometric reader may comprise any suitable device, for example, a fingerprint scanner, a palm print scanner, an iris scanner, a facial scanner, etc.

In step 120, a decryption key is acquired from a key carrying device. The key carrying device is external to the authenticating device and the acquisition of the decryption key is performed in response to the key carrying device being in the vicinity of the authenticating device.

That the key carrying device is external to the authentication device is intended to indicate that the key carrying devices and the authenticating device are not physically connected, and that their respective locations are independent from each other.

The decryption key may, for example, be acquired via a wireless communication interface, such as a radio interface, of the authenticating device. That the key carrying devices is in the vicinity of the authenticating device may, for example, be interpreted as the key carrying devices being within signal range of the wireless communication interface of the authenticating device (e.g. at a distance from the authenticating device where an open identifier of the key carrying device can be read by the wireless communication interface).

The key carrying device may, for example, be a body-integrated or body-worn bio tag such as an NFC tag or an RFID tag. A body-integrated bio tag may be implanted in the user, while a body-worn bio tag may be securely attached to the body (e.g. using a wrist band having a functionality that indicates tampering and/or removal).

Typically, the key carrying device is associated with the prospect user providing the set of biometric data via the biometric reader. Then, the decryption key is also associated with the prospect user.

It should be noted that when an association between a user and a decryption key is referred to herein, the association may be via biometric data or biometric features of the user. Hence, that the decryption key is associated with a user may be interpreted as the decryption key being associated with a set of biometric data, a set of biometric features, and/or a biometric template of the user.

In step 130, at least a part of an encrypted biometric template associated with an enrolled user of the authentication device is retrieved from a storage medium and, in step 140, the retrieved part of the biometric template is decrypted using the acquired decryption key. It should be noted that the entire biometric template is indeed also a part of the biometric template.

Typically, the encrypted biometric template may be received in step 130 based on the decryption key acquired in step 120. Thus, if the decryption key associated with the prospect user is not also associated with an enrolled user, the authentication device will not be able to retrieve a suitable biometric template in step 130 and/or the decryption in step 140 will not be successful.

The biometric template may be any suitable biometric template, for example, a fingerprint template, a palm print template, an iris template, facial feature template, etc.

The enrolment of the user may have occurred directly at the authentication device or at another device. The storage medium may be comprised in the authentication devices or it may be otherwise situated, e.g. comprised in a cloud-based server external to the authenticating device.

After the decryption of step 140, the acquired decryption key may be discarded as illustrated by optional step 150. Thus, the acquired decryption key is only temporarily present in the authentication device. Typically, the acquired decryption key may be discarded as soon as the attempt to authenticate the prospect user as the enrolled user is completed. For example, the acquired decryption key may be discarded after decryption of one, or another specified number of, template(s); or when one, or another specified number of, failed decryption attempt(s) have been conducted. Alternatively, the acquired decryption key may be discarded when the outcome of the entire authentication process illustrated in FIG. 1 is determined. Yet alternatively, the acquired decryption key may be discarded when a pre-determined time has elapsed. In any case, the decryption key is only temporarily acquired according to these embodiments.

Thus, the acquired decryption key may be only temporarily available (e.g. for a specified time period) in the authentication device according to some typical embodiments. Typically, the same or similar conditions may apply to the decrypted template as also elaborated on herein.

In step 160, an attempt to authenticate the prospect user as the enrolled user is performed. The authentication attempt is based on a comparison between the acquired set of biometric data and the decrypted part of the biometric template. In step 170, it is determined whether a match is found between the acquired set of biometric data and the decrypted part of the biometric template.

If so (Y-path out from step 170), an action associated with the detected match is performed. For example, access may be granted or a signal indicative of the match may be generated as indicated in step 180. If a match is not detected (N-path out from step 170), an action associated with the mismatch is performed. For example, access may be denied or a signal indicative of the mismatch may be generated as indicated in step 190. Alternatively or additionally, a mismatch may trigger repetition of some method steps (e.g. from step 130) based on the same acquired decryption key for more than one (part of a) biometric template as suitable.

Generally, the implementation of steps 160, 170, 180 and 190 may be according to any suitable known or future authentication approach.

When the attempt to authenticate the prospect user as the enrolled user is successful (step 180), the method may also comprise locally storing the decrypted part of the biometric template and allowing further attempts to authenticate the prospect user as the enrolled user based on the locally stored decrypted part of the biometric template.

Such an approach may be user friendly since the authentication process is simplified for the further attempts in that steps 120, 130, 140, 150 may be ignored. In some variants as will be exemplified in connection to FIG. 3c, further authentication attempts may still be subject to a process involving the key carrying device (i.e. similar to that of step 120) for access requests which require a high level of security (low FAR).

The locally stored decrypted part of the biometric template may be discarded when a discarding event occurs. The discarding event may for example comprise one or more of: occurrence of a number of failed authentication attempts, occurrence of a number of successful authentication attempts, elapse of a predetermined duration of time, detection that the key carrying device has not been in the vicinity of the authentication device during a predetermined time interval, shut-down/start-up/reboot of the authenticating device, occurrence of a geofencing event (the authenticating device leaving a secure area such as a home or an office), etc.

Thus, the decrypted part of the biometric template is only temporarily present in the authentication device. In some embodiments, the decrypted part of the biometric template may be discarded as soon as the attempt to authenticate the prospect user as the enrolled user is completed. For example, the decrypted part of the biometric template may be discarded when one, or another specified number of, failed authentication attempt(s) have been conducted. Alternatively, the decrypted part of the biometric template may be discarded when the outcome of the entire authentication process illustrated in FIG. 1 is determined. Yet alternatively, the decrypted part of the biometric template may be discarded when a pre-determined time has elapsed. In any case, the decrypted part of the biometric template is, typically, only temporarily acquired according to these embodiments. Thus, the decrypted part of the biometric template may be only temporarily available (e.g. for a specified time period) in the authentication device according to some typical embodiments.

Typically, the decrypted part of the biometric template may be stored in a trusted and/or protected volatile storage such as a trusted execution environment (TEE), e.g. implemented using a random access memory (RAM), for these embodiments.

Enrollment of a user may comprise acquiring, via the biometric reader, an enrolment set of biometric data associated with the user to be enrolled and acquiring of an encryption key (which is associated with the decryption key and may or may not be equal to the decryption key) from the key carrying device associated with the user to be enrolled. The enrolment further comprises encrypting, using the acquired encryption key, a biometric template created based on the acquired enrollment set of biometric data and storing the encrypted biometric template in the storage medium.

Storing the encrypted biometric template in the storage medium may further comprise transferring at least a portion of the encrypted biometric template to one or more other authenticating devices and/or to a biometric template server (e.g. a cloud-based server) for retrieval by one or more other authenticating devices.

Figure 2A:
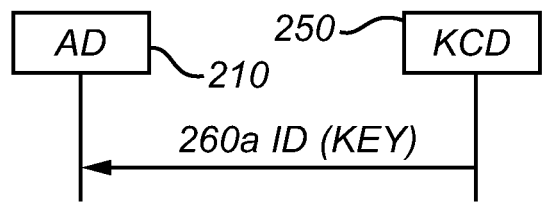
FIGS. 2a, 2b and 2c are signaling diagrams illustrating example signaling according to some embodiments.
Figure 2B:
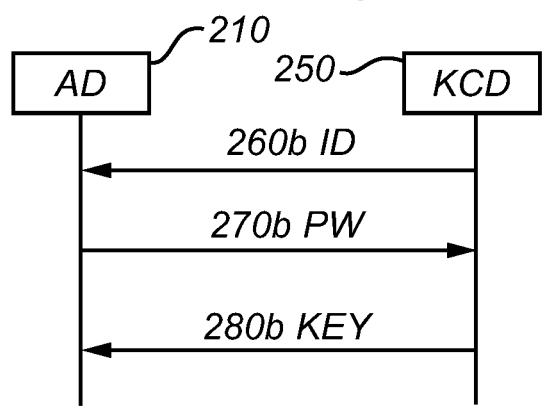
Figure 2C:
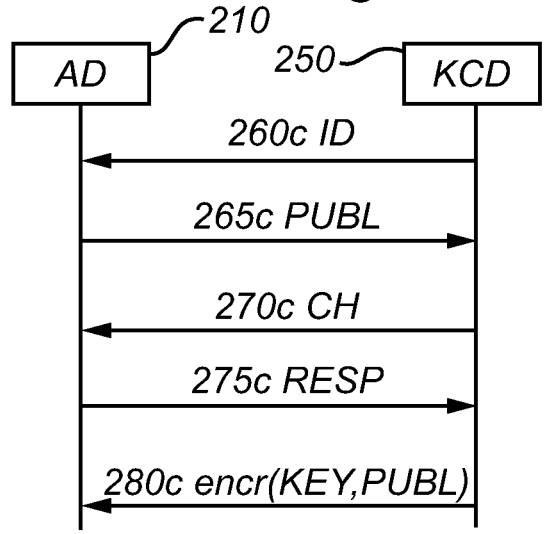

FIGS. 2a, 2b and 2c are signaling diagrams illustrating various example signaling between an authenticating device (AD) 210 and a key carrying device (KCD) 250 according to some embodiments. For example, the signaling illustrated in FIGS. 2a-c may be performed to acquire the decryption key in connection to step 120 of FIG. 1.

In a first example (FIG. 2a), the decryption key (KEY) comprises an open identifier (ID) of the key carrying device and acquiring the decryption key comprises reading the open identifier from the key carrying device as illustrated by 260a ID (KEY) in FIG. 2a. The open identifier may, for example, be an identification number or an identification sequence. Examples of an open identifier include a near field communication user identification (NFC-UID).

In a second example (FIG. 2b), the decryption key (KEY) comprises a protected key and acquiring the decryption key comprises (in response to detecting that the key carrying device is in the vicinity and/or reading the open identifier as illustrated by 260b ID in FIG. 2b) providing a password to the key carrying device as illustrated by 270b PW in FIG. 2b and, in response thereto, receiving the protected key from the key carrying device as illustrated by 280b KEY in FIG. 2b.

The password may, typically, be associated with the key carrying device. For example, after reading the open identifier 260b ID, the authenticating device may be able to determine the password based on the open identifier (e.g. by calculation, mapping, table look-up, memory parsing, etc.).

Receiving the protected key is typically only possible if the provided password is determined to be correct by the key carrying device. If the provided password is determined by the key carrying device to be incorrect, then the key carrying device may either send a message indicative thereof to the authentication device or stay silent.

The second example may be particularly applicable for pairing of the authentication device and the key carrying device in a controlled environment such as a factory facility. In such scenarios, the decryption key may be a static key such as an advanced encryption standard (AES) key, e.g. AES256.

In a third example (FIG. 2c), the authenticating device keeps a communication key pair comprising a public communication key (PUBL) and a private communication key and acquiring the decryption key comprises (in response to detecting that the key carrying device is in the vicinity and/or reading the open identifier as illustrated by 260c ID in FIG. 2c) transmitting the public communication key to the key carrying device as illustrated by 265c PUBL in FIG. 2c, receiving a challenge message from the key carrying device as illustrated by 270c CH in FIG. 2c and transmitting a response message to the key carrying device as illustrated by 275c RESP in FIG. 2c. In these embodiments, acquiring the decryption key (KEY) also comprises (if the response message is determined by the key carrying device as matching the challenge message, i.e. when the transmitted response message is correct) receiving the decryption key from the key carrying device wherein the decryption key is encrypted by the public communication key as illustrated by 280c encr(KEY,PUBL) in FIG. 2c, and decrypting the decryption key using the private communication key.

The challenge/response messaging may be in accordance with any suitable protocol. To further increase security in the third example and/or to avoid repetition in the challenge/response messaging, a sequence number may be used in the generation of either or both of the challenge/response messages.

To further enhance integrity of the communication between the key carrying device (e.g. bio tag) and the authenticating device, it is possible to incorporate any number of techniques known from Internet communication. These include (but are not limited to) two-way encryption using keys, transient keys, certificates; applying a limitation regarding number of attempts; and enforcing sequence numbers.

The third example may be particularly applicable for pairing of the authentication device and the key carrying device in an uncontrolled (open, public, unsecure) environment, where the two devices may never have interacted with each other before. In such scenarios, a more advanced encryption method may be required such as RSA (Rivest-Shamir-Adleman) encryption.

Figure 3A:
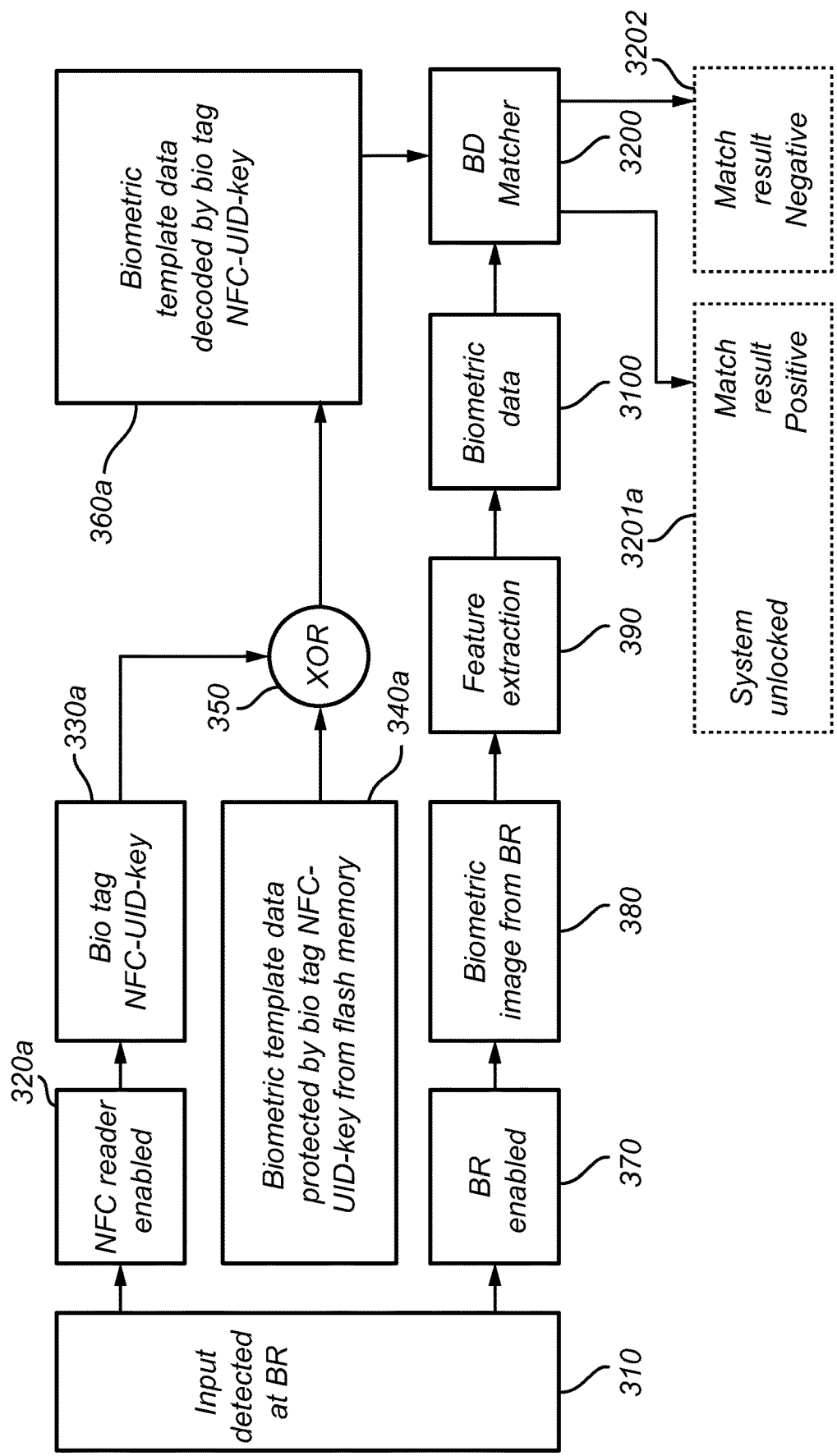
FIGS. 3a, 3b and 3c are schematic drawings illustrating example authentication processes according to some embodiments.
Figure 3B:
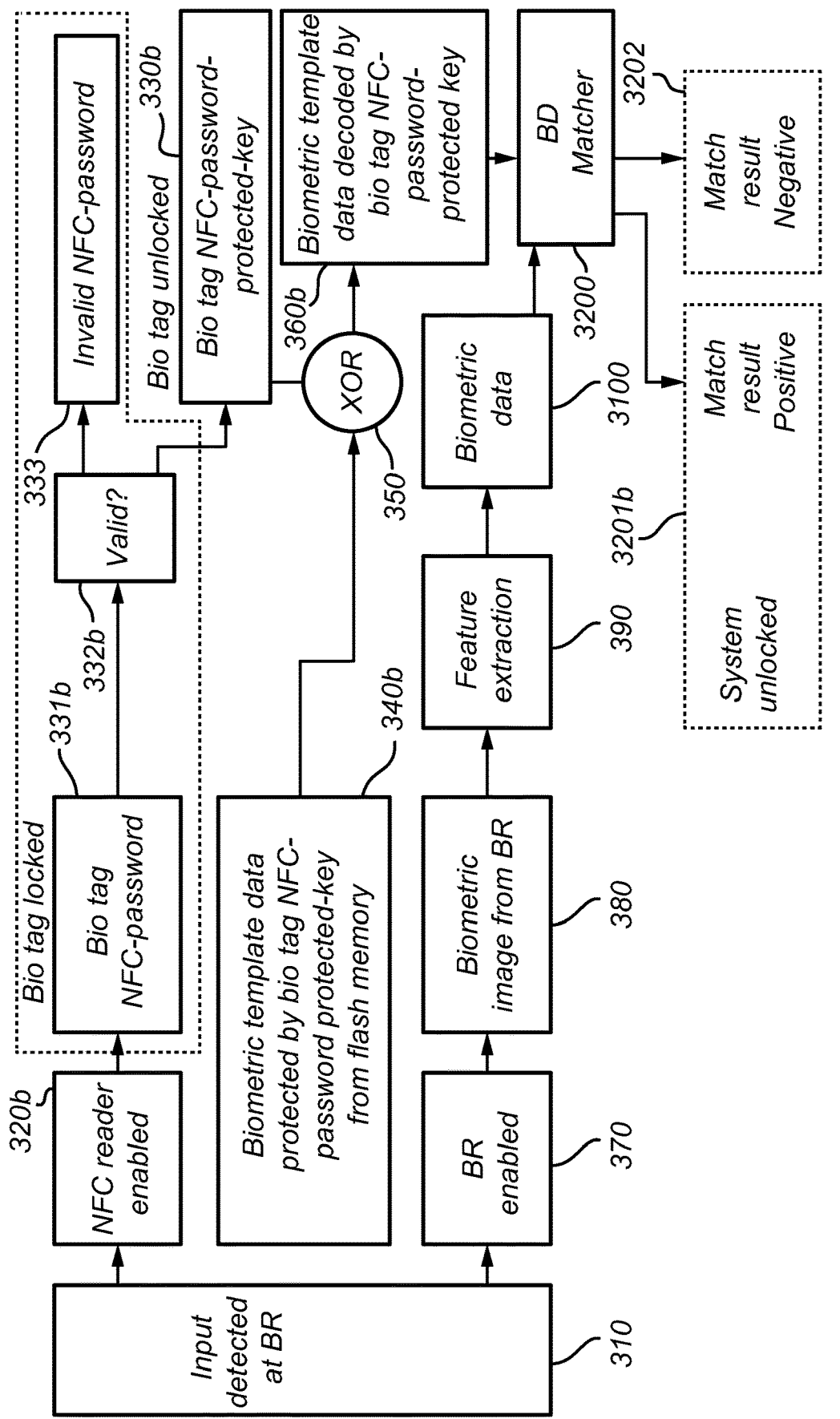
Figure 3C:
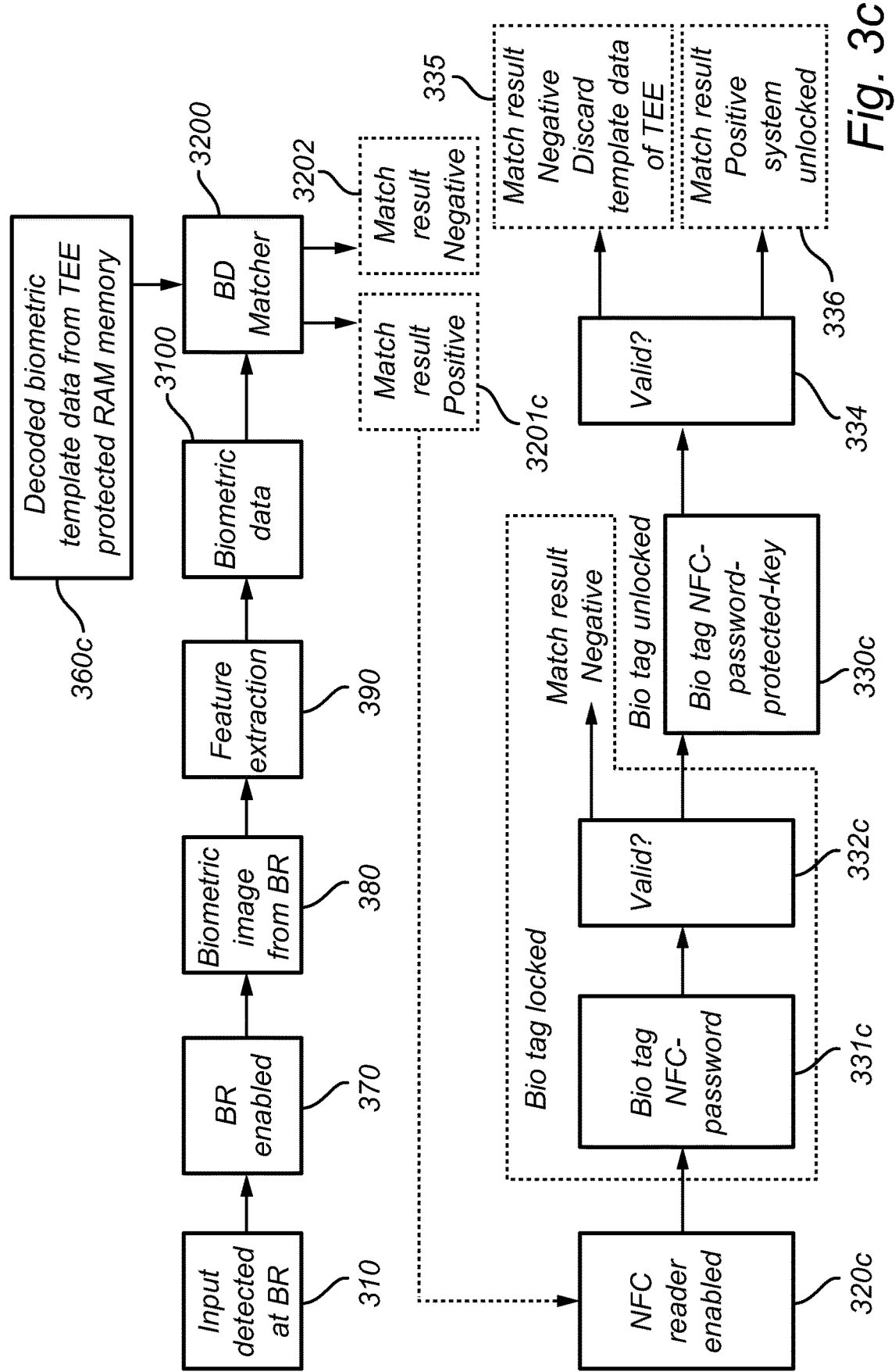

FIGS. 3a, 3b and 3c schematically illustrate various example authentication processes according to some embodiments. In these examples, an XOR operation is used to encrypt/decrypt the biometric data templates.

In all three of these figures, the authentication process is initiated by detecting an input at the biometric reader BR (e.g. detecting that a conducting object, e.g. a finger, is present on a specific area, a fingerprint reader), as illustrated by 310. The biometric reader is enabled as illustrated by 370, and a biometric image is obtained from the biometric reader as illustrated by 380. The biometric image undergoes feature extraction as illustrated by 390, and biometric data as illustrated by 3100 is provided to a biometric data (BD) matcher as illustrated by 3200. This part of the process may be compared with step 110 of FIG. 1.

In FIG. 3a (compare with the first example referred to above), the presence of the input at the biometric reader triggers enabling of an NFC reader of the authenticating device as illustrated by 320a. If a bio tag is in the vicinity of the NFC reader, a NFC-UID-key (e.g., 7 byte, 56 bit) of the bio tag may be read as illustrated by 330a (compare with 260a of FIG. 2a and with step 120 of FIG. 1). Then, biometric template data protected by the NFC-UID-key may be fetched from a flash memory as illustrated by 340a (compare with step 130 of FIG. 1).

As illustrated by 350, the read NFC-UID-key may be XORed with the fetched protected biometric template data (compare with step 140 of FIG. 1) to provide decoded biometric template data as illustrated by 360a, which is provided to the BD matcher as illustrated by 3200.

In FIG. 3b (compare with the second example referred to above), the detection of input at the biometric reader triggers enabling of an NFC reader of the authenticating device which sends a password to a locked bio tag detected to be in the vicinity for enabling the bio tag to send the decryption key as illustrated by 320b (compare with 270b of FIG. 2b). In the bio tag, the NFC-password (e.g., 512 byte, 4096 bit) illustrated by 331b is tested for validity as illustrated by 332b. If the NFC-password is found invalid, the bio tag remains locked as illustrated by 333. If the NFC-password is found valid, the bio tag is unlocked and sends its NFC-password-protected-key (e.g., 512 byte, 4096 bit) to the authentication device as illustrated by 330b (compare with 280b of FIG. 2b and with step 120 of FIG. 1). Then, biometric template data protected by the NFC-password-protected-key may be fetched from a flash memory as illustrated by 340b (compare with step 130 of FIG. 1).

As illustrated by 350, the received NFC-password-protected-key may be XORed with the fetched protected biometric template data (compare with step 140 of FIG. 1) to provide decoded biometric template data as illustrated by 360b, which is provided to the BD matcher as illustrated by 3200.

In both FIGS. 3a and 3b, the matcher performs any suitable matching process between the biometric data of 3100 and the biometric template data of 360a, 360b (compare with steps 160 and 170 of FIG. 1). If the match result is negative as illustrated by 3202, the system remains locked (compare with step 190 of FIG. 1). If the match result is positive as illustrated by 3201a, 3201b, the system is unlocked (compare with step 180 of FIG. 1).

As mentioned before the decoded biometric template data of 360a or 360b may be temporarily stored, e.g. in a trusted execution environment (TEE) protected RAM memory. FIG. 3c illustrates using such stored decoded biometric template data as illustrated by 360c as input to the biometric matcher 3200.

In FIG. 3c, the matcher performs any suitable matching process between the biometric data of 3100 and the stored decoded biometric template data of 360c (compare with steps 160 and 170 of FIG. 1). If the match result is negative as illustrated by 3202, the system remains locked (compare with step 190 of FIG. 1). If the match result is positive as illustrated by 3201c (compare with step 180 of FIG. 1), the system may be unlocked for functions requiring a relatively low level of security.

For functions requiring a relatively high level of security, the lower part of FIG. 3c may be applied if the match result is positive as illustrated by 3201c. In such an approach, a positive matching result (between the biometric data of 3100 and the stored decoded biometric template data of 360c) triggers enabling of the NFC reader of the authenticating device which sends a password to a locked bio tag detected to be in the vicinity for enabling the bio tag to send the decryption key as illustrated by 320c. In the bio tag, the NFC-password (e.g., 512 byte, 4096 bit) illustrated by 331c is tested for validity as illustrated by 332c. If the NFC-password is found invalid, the bio tag remains locked, the authentication device does not receive any key from the bio tag, and the authentication ends in a negative match result. If the NFC-password is found valid, the bio tag is unlocked and sends its NFC-password-protected-key (e.g., 512 byte, 4096 bit) to the authentication device as illustrated by 330*c*.

When received at the authentication device, the NFC-password-protected-key is tested for validity as illustrated by 334. Similarly to the process illustrated in FIG. 3*b*, the validity test of 334 may typically comprise using the NFC-password-protected-key to decrypt the encrypted biometric template and match it to the biometric data (compare with 340*b*, 350, 360*b* and 3200 of FIG. 3*b*), wherein a positive match may be considered to indicate a valid NFC-password-protected-key and a negative match may be considered to indicate an invalid NFC-password-protected-key.

If the NFC-password-protected-key is found invalid, the authentication ends in a negative match result as illustrated by 335. In this case the stored decoded biometric template data of 360*c* may be discarded for security reasons. If the NFC-password-protected-key is found valid, the authentication result is deemed positive as illustrated by 336, and the system is unlocked.

FIG. 3*c* illustrates use of a process similar to that of FIGS. 2*b* and 3*b* for functions requiring a relatively high level of security. However, a process similar to that of FIGS. 2*a* and 3*a* may alternatively be used.

In the approach of FIG. 3*c*, sniffing of the bio tag NFC-password is mitigated since the NFC reader will not be enabled unless the biometric matches a temporarily stored decrypted template in 3200. Furthermore, the authentication will be fast in the approach of FIG. 3*c* for functions requiring a relatively low level of security since the template is already decrypted and available in the TEE in protected RAM.

When the approach in FIG. 3*c* (or any other approach where decoded template parts are temporarily stored) is to be applied the full procedure of FIG. 3*b* (or any other approach involving acquisition of the decryption key and decryption of template parts) may be required also for functions requiring a relatively low level of security under certain conditions. For example, the full procedure may be required when the temporarily stored decoded template parts have been discarded for some reason as elaborated on above. Alternatively or additionally, the full procedure may be required at startup or reboot of the authenticating device.

FIG. 4 schematically illustrates an example arrangement according to some embodiments. The example arrangement may be comprised in an authentication device (AD) 400 which may, in turn, form an authentication system together with a key carrying device (KCD) 490 which is external to the authenticating device. The arrangement of FIG. 4 may, for example, be configured to case execution of the method steps described in connection with FIG. 1 or otherwise described herein.

Thus, the arrangement of FIG. 4 is for handling biometric templates for an authenticating device applying biometric authentication. The arrangement comprises a controller (CNTR; e.g. controlling circuitry or a controlling unit) 410 configured to cause execution of the method steps described in connection with FIG. 1.

The controller is configured to cause acquisition, via a biometric reader (e.g. biometric reading circuitry) 420, of a set of biometric data associated with a prospect user of the authenticating device (compare with step 110 of FIG. 1). In some embodiments, the arrangement comprises the biometric reader configured to provide the set of biometric data associated with the prospect user of the authenticating device.

The controller is also configured to cause acquisition of a decryption key—associated with an enrolled user of the authenticating device—from the key carrying device 490 responsive to the key carrying device being in a vicinity of the authenticating device 400 (compare with step 120 of FIG. 1). The acquisition of the decryption key may be via a wireless communication interface (e.g. wireless communication interface circuitry or a wireless communication interface unit), for example a radio interface (RI) 430, such as an NFC reader. In some embodiments, the arrangement comprises the wireless communication interface.

The controller is further configured to cause retrieval, from a storage medium (e.g. storing circuitry or a storing unit) 440, 441 and via a storage medium interface 450, 451, of at least a part of an encrypted biometric template associated with the enrolled user (compare with step 130 of FIG. 1). The arrangement may comprise the storage medium interface 450, 451, which may, for example, be a wireless communication interface, a wired communication interface, a communication bus, etc.

In some embodiments, the arrangement may comprise the storage medium 440 as illustrated in FIG. 4. In some embodiments, the storage medium 441 is external to the arrangement or even external to the authentication device as also illustrated in FIG. 4. For example, the storage medium may be comprised in a cloud-based server external to the authenticating device. In some embodiments, the storage medium 440, 441 is a combination of storage medium in the authenticating device (comprised in, or external to, the arrangement) and storage medium external to the authenticating device (e.g. in a cloud-based server).

The controller is also configured to cause decryption—by a decrypter (DECR; e.g. decryption circuitry or a decryption unit) 412—of the retrieved part of the biometric template using the acquired decryption key (compare with step 140 of FIG. 1). In some embodiments, the arrangement comprises the decrypter, which may or may not be comprised in the controller.

The controller is further configured to cause performance—by an authenticator (AUTH; e.g. authentication circuitry or an authentication unit) 414—of an attempt to authenticate the prospect user as the enrolled user based on a comparison between the acquired set of biometric data and the decrypted part of the biometric template (compare with steps 160, 170, 180 and 190 of FIG. 1). In some embodiments, the arrangement comprises the authenticator, which may or may not be comprised in the controller.

The arrangement may also comprise a signal generator (SG; e.g. signal generating circuitry or a signal generating unit) 460 configured to generate at least one of a signal indicative of a match and a signal indicative of a mismatch. The signal generator may be configured to provide such signals to an interface (IF; e.g. interface circuitry or an interface unit) 470 for granting or denying access, as applicable.

In some embodiments, the controller is further configured to cause enrollment of a user of the authenticating device by causing acquisition, via the biometric reader, of an enrollment set of biometric data associated with the user to be enrolled and acquisition of an encryption key from the key carrying device associated with the user to be enrolled. The controller is further configured to cause encryption, using the acquired encryption key, of a biometric template created based on the acquired enrollment set of biometric data and storing of the encrypted biometric template in the storage medium.

The controller may be configured to cause transfer of at least a portion of the encrypted biometric template to one or more other authenticating devices and/or to a biometric template server for retrieval by one or more other authenticating devices.

Figure 5A:
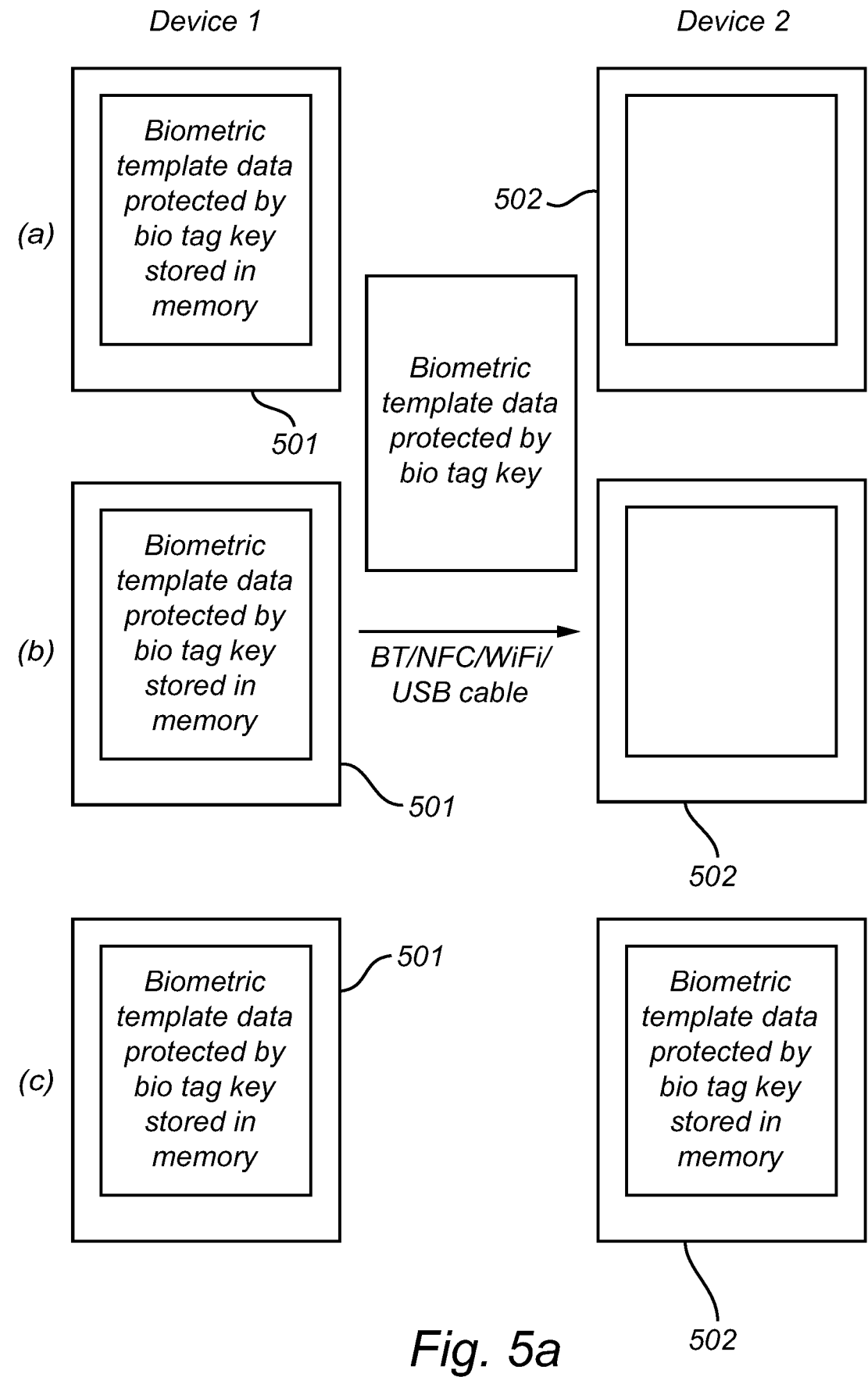
FIGS. 5a and 5b are schematic drawings illustrating example transfers of encrypted biometric templates according to some embodiments.
Figure 5B:
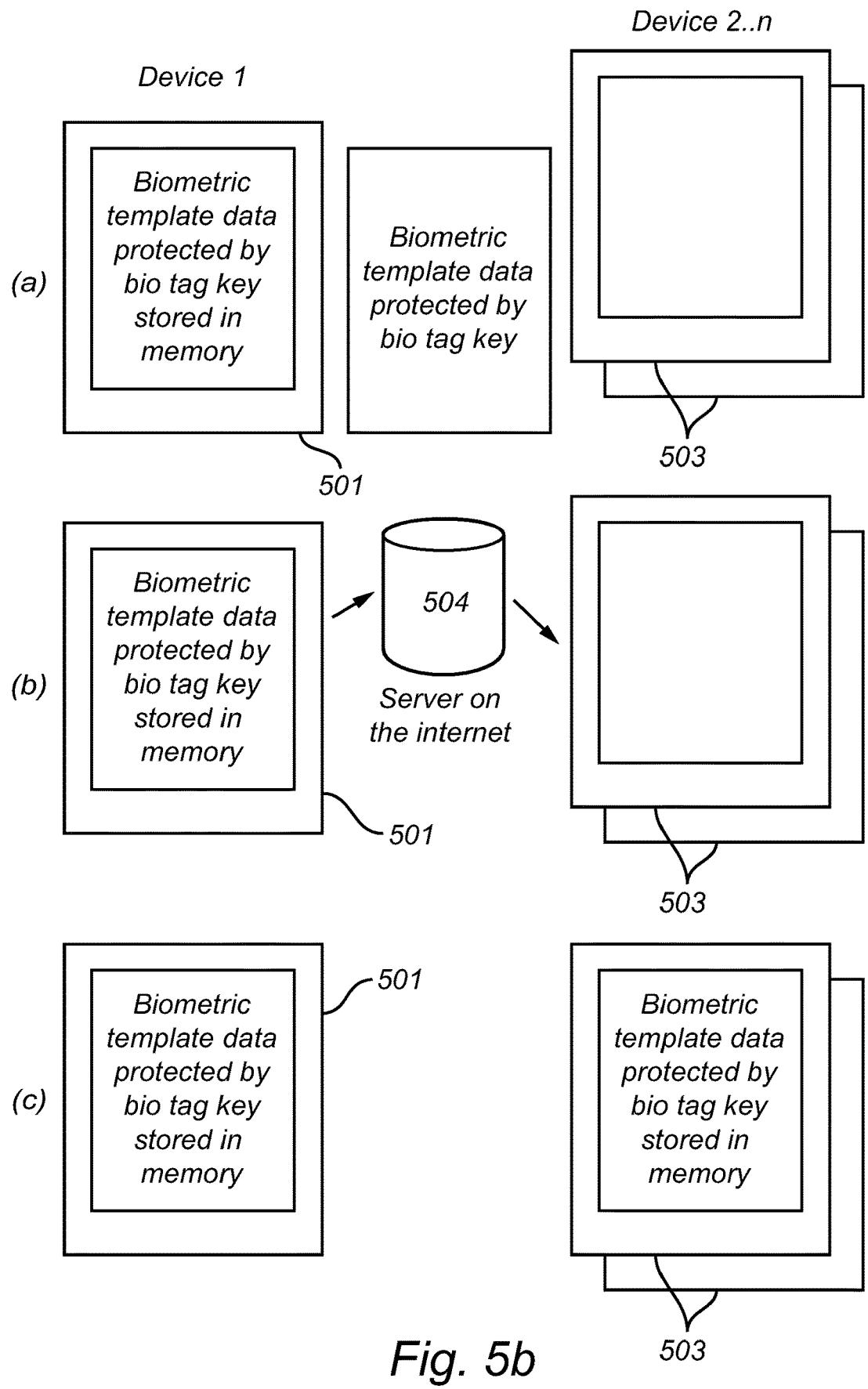

FIGS. 5a and 5b schematically illustrate example transfers of encrypted biometric templates according to some embodiments.

FIG. 5a illustrates template transfer from Device 1 (501) to Device 2 (502) via local connectivity. In part (a), biometric template data protected by bio tag key is only kept in Device 1. In part (b), a copy of the biometric template data protected by the bio tag key is transferred to Device 2 via local connectivity (e.g. Bluetooth—BT, NFC, WiFi, universal serial bus—USB—cable, etc.). In part (c), the biometric template data protected by bio tag key is kept in Device 1 and in Device 2.

FIG. 5b illustrates template transfer from Device 1 (501) via a biometric template server 504 (e.g. a cloud-based server, a server on the Internet) for distribution to Devices 2 . . . n (503). In part (a), biometric template data protected by bio tag key is only kept in Device 1. In part (b), a copy of the biometric template data protected by the bio tag key is transferred to Devices 2 . . . n via local the server 504. In part (c), the biometric template data protected by bio tag key is kept in Device 1 and in Devices 2 . . . n.

Thus, according to some embodiments, it is proposed to use an encryption key associated with a corresponding decryption key stored in a bio tag to encrypt biometric templates. Thereby, it is not possible to use the biometric templates unless the corresponding decryption key from the bio tag is also accessible. Since the bio tag key (i.e. the decryption key) is not permanently stored on the authentication device, the biometric template data is secure and can even be transferred to other devices without security concerns. The biometric template may thereby be used on any device (without the need for separate enrolment on each device), but only when the bio tag is physically present.

Advantages of some embodiments include (but are not limited to):
The security of authentication is increased.
The security of authentication is flexible.
The security of template transfer is increased.
The biometric templates can be re-used on several different devices to avoid repeated enrolments.
The biometric templates can be securely stored in a central location, e.g. on a cloud-based biometric template server.
The collection of templates of the authentication device or of a biometric template server is encrypted and cannot be extracted in useable form.

Compared to an approach where fingerprint templates are encrypted using a device specific key generated by the authenticating device, and where the encrypted fingerprint templates are stored in the same authenticating device, the embodiments disclosed herein are different at least in that:
The key is not generated by (nor stored in) the device storing the template (the authenticating device), but is rather provided by some other device (the key carrying device) based on a vicinity criterion between the device storing the template and the other device.
The key is not specific to the device storing the template, but is rather associated with the user identifiable by the template.

Technical effects achieved by these differences include increased security and usability as elaborated on above. The security is increased since the template cannot be decrypted without the presence of the other device. The usability is improved since encrypted templates can be (securely) distributed among, and used by, many devices due to that the key is not device specific.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as an authenticating device.

Embodiments may appear within an electronic apparatus (such as an authenticating device) comprising arrangements, circuitry, and/or logic according to any of the embodiments described herein. Alternatively or additionally, an electronic apparatus (such as an authenticating device) may be configured to perform methods according to any of the embodiments described herein.

Figure 6:
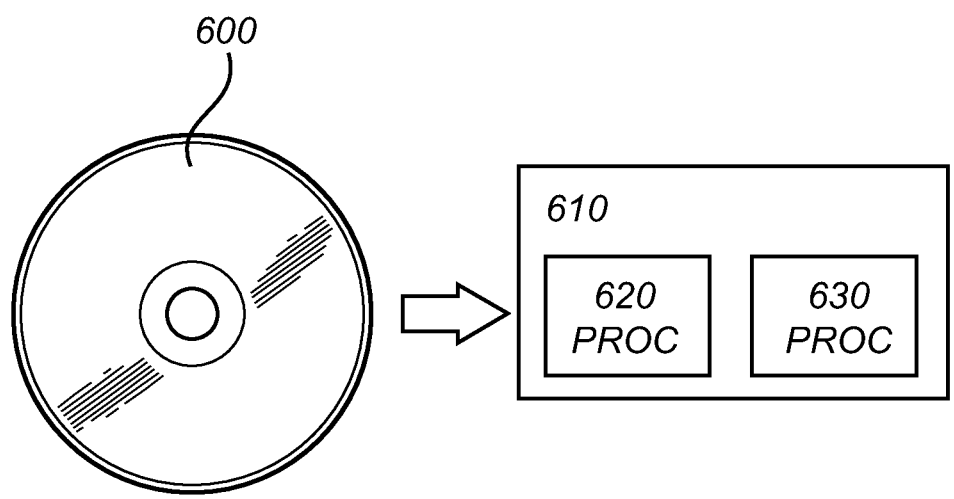
FIG. 6 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC) 620, which may, for example, be comprised in an authenticating device 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, the method illustrated in FIG. 1 or otherwise described herein.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method for handling biometric templates for an authenticating device applying biometric authentication, the method comprising:
    acquiring, via a biometric reader, a set of biometric data associated with a prospect user of the authenticating device;
    acquiring a decryption key from a key carrying device external to the authenticating device responsive to the key carrying device being in a vicinity of the authenticating device, wherein the decryption key is associated with an encrypted biometric template associated with an enrolled user of the authenticating device;
    retrieving, from a storage medium, at least a part of the encrypted biometric template associated with the enrolled user;
    decrypting the retrieved part of the biometric template using the acquired decryption key; and
    performing an attempt to authenticate the prospect user as the enrolled user based on a comparison between the acquired set of biometric data and the decrypted part of the biometric template,
    wherein the authenticating device keeps a communication key pair comprising a public communication key and a private communication key, and wherein acquiring the decryption key comprises:
        transmitting the public communication key to the key carrying device;
        receiving a challenge message from the key carrying device;
        transmitting a response message to the key carrying device;
        receiving the decryption key from the key carrying device when the transmitted response message is correct, wherein the decryption key is encrypted by the public communication key; and
        decrypting the decryption key using the private communication key.

2. The method of claim 1 wherein the decryption key comprises an open identifier of the key carrying device and wherein acquiring the decryption key comprises reading the open identifier from the key carrying device.

3. The method of claim 1 wherein the decryption key comprises a protected key and wherein acquiring the decryption key comprises:
    providing a password to the key carrying device; and
    in response thereto, receiving the protected key from the key carrying device.

4. A method for handling biometric templates for an authenticating device applying biometric authentication, the method comprising:
    acquiring, via a biometric reader, a set of biometric data associated with a prospect user of the authenticating device;
    acquiring a decryption key from a key carrying device external to the authenticating device responsive to the key carrying device being in a vicinity of the authenticating device, wherein the decryption key is associated with an encrypted biometric template associated with an enrolled user of the authenticating device;
    retrieving, from a storage medium, at least a part of the encrypted biometric template associated with the enrolled user;
    decrypting the retrieved part of the biometric template using the acquired decryption key;
    performing an attempt to authenticate the prospect user as the enrolled user based on a comparison between the acquired set of biometric data and the decrypted part of the biometric template; and
    when the attempt to authenticate the prospect user as the enrolled user is successful:
        locally storing the decrypted part of the biometric template;
        allowing further attempts to authenticate the prospect user as the enrolled user based on the locally stored decrypted part of the biometric template; and
        discarding the locally stored decrypted part of the biometric template when a discarding event occurs.

5. The method of claim 1 further comprising transferring at least a portion of the encrypted biometric template to:
    one or more other authenticating devices; and/or
    a biometric template server for retrieval by one or more other authenticating devices.

6. The method of claim 1 wherein the biometric template is a fingerprint template and the acquired set of biometric data is indicative of one or more fingerprint features.

7. The method of claim 1 wherein the biometric template is an iris template and the acquired set of biometric data is indicative of one or more iris features.

8. The method of claim 1 further comprising discarding the acquired decryption key as soon as the attempt to authenticate the prospect user as the enrolled user is completed.

9. The method of claim 1 wherein the storage medium is comprised in the authenticating device.

10. The method of claim 1 wherein the storage medium is comprised in a cloud-based server external to the authenticating device.

11. The method of claim 1 wherein the part of the biometric template comprises the entire biometric template.

12. The method of claim 1 further comprising enrolling a user of the authenticating device by:
    acquiring, via the biometric reader, an enrolment set of biometric data associated with the user to be enrolled;
    acquiring an encryption key from the key carrying device associated with the user to be enrolled, wherein the encryption key is associated with the decryption key of the key carrying device;
    encrypting, using the acquired encryption key, a biometric template created based on the acquired enrollment set of biometric data; and
    storing the encrypted biometric template in the storage medium.

13. A computer program product comprising a non-transitory computer readable medium, having thereon a computer program comprising program instructions, the computer program being loadable into a data processing unit and configured to cause execution of the method according to claim 1 when the computer program is run by the data processing unit.

14. An arrangement for handling biometric templates for an authenticating device applying biometric authentication, the arrangement comprising a controller configured to cause:
    acquisition, via a biometric reader, of a set of biometric data associated with a prospect user of the authenticating device;
    acquisition of a decryption key from a key carrying device external to the authenticating device responsive to the key carrying device being in a vicinity of the authenticating device, wherein the decryption key is associated with an encrypted biometric template associated with an enrolled user of the authenticating device;

retrieval, from a storage medium, of at least a part of the encrypted biometric template associated with the enrolled user;

decryption of the retrieved part of the biometric template using the acquired decryption key; and performance of an attempt to authenticate the prospect user as the enrolled user based on a comparison between the acquired set of biometric data and the decrypted part of the biometric template, wherein the authenticating device keeps a communication key pair comprising a public communication key and a private communication key, and wherein the controller is configured to cause acquisition of the decryption key by causing:

transmission of the public communication key to the key carrying device;

reception of a challenge message from the key carrying device;

transmission of a response message to the key carrying device;

reception of the decryption key from key carrying device when the transmitted response message is correct, wherein the decryption key is encrypted by the public communication key; and decryption of the decryption key using the private communication key.

15. The arrangement of claim 14 wherein the decryption key comprises an open identifier of the key carrying device and wherein the controller is configured to cause acquisition of the decryption key by causing reading of the open identifier from the key carrying device.

16. The arrangement of claim 14 wherein the decryption key comprises a protected key and wherein the controller is configured to cause acquisition of the decryption key by causing:

provision of a password to the key carrying device; and in response thereto, reception of the protected key from the key carrying device.

17. An arrangement for handling biometric templates for an authenticating device applying biometric authentication, the arrangement comprising a controller configured to cause:

acquisition, via a biometric reader, of a set of biometric data associated with a prospect user of the authenticating device;

acquisition of a decryption key from a key carrying device external to the authenticating device responsive to the key carrying device being in a vicinity of the authenticating device, wherein the decryption key is associated with an encrypted biometric template associated with an enrolled user of the authenticating device;

retrieval, from a storage medium, of at least a part of the encrypted biometric template associated with the enrolled user;

decryption of the retrieved part of the biometric template using the acquired decryption key;

performance of an attempt to authenticate the prospect user as the enrolled user based on a comparison between the acquired set of biometric data and the decrypted part of the biometric template; and responsive to the attempt to authenticate the prospect user as the enrolled user being successful:

local storing of the decrypted part of the biometric template;

allowance of further attempts to authenticate the prospect user as the enrolled user based on the locally stored decrypted part of the biometric template; and discarding of the locally stored decrypted part of the biometric template when a discarding event occurs.

18. The arrangement of claim 14 wherein the controller is further configured to cause transfer of at least a portion of the encrypted biometric template to:

one or more other authenticating devices; and/or a biometric template server for retrieval by one or more other authenticating devices.

19. The arrangement of claim 14 wherein the biometric template is a fingerprint template and the acquired set of biometric data is indicative of one or more of fingerprint features.

20. The arrangement of claim 14 wherein the biometric template is an iris template and the acquired set of biometric data is indicative of one or more iris features.

21. The arrangement of claim 14 wherein the controller is further configured to cause discarding of the acquired decryption key as soon as the attempt to authenticate the prospect user as the enrolled user is completed.

22. The arrangement of claim 14 wherein the storage medium is comprised in a cloud-based server external to the authenticating device.

23. The arrangement of claim 14 further comprising the storage medium.

24. The arrangement of claim 14 wherein the controller is further configured to cause enrollment of a user of the authenticating device by causing:

acquisition, via the biometric reader, of an enrolment set of biometric data associated with the user to be enrolled;

acquisition of an encryption key from the key carrying device associated with the user to be enrolled, wherein the encryption key is associated with the decryption key of the key carrying device;

encryption, using the acquired encryption key, of a biometric template created based on the acquired enrollment set of biometric data; and storing of the encrypted biometric template in the storage medium.

25. An authenticating device comprising the arrangement of claim 14.

26. An authentication system comprising the authenticating device of claim 25 and the key carrying device.

* * * * *